US012435297B2

(12) United States Patent
Falk et al.

(10) Patent No.: US 12,435,297 B2
(45) Date of Patent: Oct. 7, 2025

(54) SYNERGISTIC Zn/PHENOLIC SOLVENT FORMULATIONS FOR SANITIZATION AND ODOR CONTROL IN LAUNDRY

(71) Applicant: THE CLOROX COMPANY, Oakland, CA (US)

(72) Inventors: Nancy A. Falk, Bath, ME (US); Stephen F. Gross, Wyandotte, MI (US); Shakera Thamanna, Wyandotte, MI (US); Fanny Frausto, Pleasanton, CA (US); Michael D. Capracotta, Wyandotte, MI (US); Dennys D. Pena Calderon, Pleasanton, CA (US)

(73) Assignee: THE CLOROX COMPANY, Oakland, CA (US)

( * ) Notice: Subject to any disclaimer, the term of this patent is extended or adjusted under 35 U.S.C. 154(b) by 636 days.

(21) Appl. No.: 17/716,605

(22) Filed: Apr. 8, 2022

(65) Prior Publication Data

US 2023/0002703 A1 Jan. 5, 2023

Related U.S. Application Data

(60) Provisional application No. 63/217,690, filed on Jul. 1, 2021.

(51) Int. Cl.
*C11D 3/12* (2006.01)
*C11D 3/00* (2006.01)
*C11D 3/43* (2006.01)

(52) U.S. Cl.
CPC ............ *C11D 3/122* (2013.01); *C11D 3/0047* (2013.01); *C11D 3/43* (2013.01)

(58) Field of Classification Search
CPC .......... C11D 3/122; C11D 3/43; C11D 3/0047
See application file for complete search history.

(56) References Cited

U.S. PATENT DOCUMENTS 3,929,678 A 12/1975 Laughlin et al.
4,259,217 A 3/1981 Murphy
4,565,647 A 1/1986 Llenado
5,776,872 A 7/1998 Giret et al.
5,883,059 A 3/1999 Furman et al.
5,883,062 A 3/1999 Addison et al.
5,906,973 A 5/1999 Ouzounis et al.
6,482,788 B1 11/2002 Arvanitidou
6,492,313 B1 12/2002 Connors et al.
7,465,697 B1 12/2008 DeAth
7,939,488 B2 5/2011 Scheuing et al.
2004/0175264 A1 9/2004 Diesler et al.
2006/0293201 A1* 12/2006 Simon .................. C11D 3/2086 510/235
2010/0234271 A1* 9/2010 Scheuing ............. C11D 3/2065 510/465
2010/0272764 A1* 10/2010 Latta .................... A61K 9/5031 424/440
2013/0011453 A1* 1/2013 Latta ........................ A61P 29/00 424/401
2017/0165167 A1 6/2017 Schelges et al.
2018/0200164 A1* 7/2018 Latta ...................... A61Q 13/00
2022/0056374 A1* 2/2022 Guo ...................... C11D 3/2086
2022/0259523 A1* 8/2022 Falk ................... C11D 17/0008
2023/0002703 A1* 1/2023 Falk ....................... C11D 3/046

FOREIGN PATENT DOCUMENTS

EP 1504080 A1 2/2005
EP 1539906 A1 6/2005
EP 1549731 A1 7/2005
EP 1578894 A1 9/2005
EP 1613719 A1 1/2006
EP 1899449 A1 3/2008
EP 2126022 A1 12/2009
EP 2827709 A1 1/2015
EP 3500657 A1 6/2019
WO 2001/028340 A2 4/2001
WO WO-0128340 A2 * 4/2001 ............. A01N 43/36
WO 03/97777 A1 11/2003
WO 2004/018599 A1 3/2004
WO 2004/035724 A1 4/2004
WO 2004/061068 A1 7/2004
WO 2004/092319 A1 10/2004
WO 2006/131690 A1 12/2006
WO 2008/075084 A1 6/2008
WO 2009/143516 A1 11/2009
WO 2013/142474 A1 9/2013
WO 2018/035131 A1 2/2018

OTHER PUBLICATIONS

International Search Report from Corresponding PCT Application No. PCT/US2022/072685, Mailed Aug. 11, 2022.

* cited by examiner

*Primary Examiner* — Mark Eashoo
*Assistant Examiner* — M. Reza Asdjodi
(74) *Attorney, Agent, or Firm* — Workman Nydegger

(57) ABSTRACT

Treatment compositions for use in laundry capable of providing sanitization through the wash e.g., for use with a detergent, where the compositions include an inorganic zinc salt potentiated by a phenolic solvent, to provide sanitization. The compositions can include an inorganic zinc salt, and a phenolic solvent, e.g., at an acidic pH (e.g., 2 to 5, or 3.5 to 4.5). The composition can include an anionic surfactant (e.g., alkyl sulfates, alkyl ether sulfates, etc.) and/or a nonionic surfactant (e.g., an alkyl polyglucoside). The composition may be free of alkoxylated nonionic surfactants which are not stable in the present compositions, which have high ionic strength (e.g., due to ~3% of the zinc salt included in the formula). The composition may be free of various other components that would not be stable in such high ionic strength conditions, or otherwise interfere with stability and efficacy of the sanitizing and/or disinfecting laundry composition.

9 Claims, No Drawings

SYNERGISTIC Zn/PHENOLIC SOLVENT FORMULATIONS FOR SANITIZATION AND ODOR CONTROL IN LAUNDRY

CROSS REFERENCE TO RELATED APPLICATIONS

The present application claims the benefit of U.S. Provisional Patent Application Ser. No. 63/217,690, filed on Jul. 1, 2021, the disclosure of which is incorporated by reference in its entirety.

BACKGROUND OF THE INVENTION

1. The Field of the Invention

The present invention is generally related to aqueous compositions for use in laundering clothing and other fabrics, particularly compositions for use in improving stain removal through pretreatment and/or during washing, while at the same time providing sanitization through the wash.

2. Description of Related Art

Various stain removal treatments are available for laundry use applications. Many such treatment compositions are added to the wash water used to wash such fabrics, or are used in pre-treating such fabrics prior to washing within the wash water. While numerous treatment compositions are available, there exists a continuing need for pre-treatment and other compositions providing improved benefits. For example, while many stain removal treatment compositions are available, there are few if any available that also provide an antimicrobial benefit when added to the wash water. It would be a further benefit if such a composition could be used at the consumers choice as (1) a pre-treatment applied directly to fabrics to remove stains and/or (2) as a wash-cycle additive to provide enhanced stain removal performance as compared to the detergent alone. In either case, whether the composition were applied as a pre-treatment, or added to the wash-water during the wash cycle, it would be particularly advantageous for the composition to not only provide stain removal, but to also provide an antimicrobial benefit (e.g., sanitization) of the fabric articles being laundered.

BRIEF SUMMARY OF THE INVENTION

The present invention is directed to treatment compositions useful as a pre-treatment to a washing step (e.g., as a laundry pre-treatment), useful in boosting stain removal during washing (e.g., when added to the wash water), or both. The compositions advantageously provide sanitization during washing, e.g., whether used as a pre-treatment, or added to the wash water during the wash cycle. In an embodiment, the treatment composition includes water, a zinc salt, a phenolic solvent, and a surfactant package (e.g., one or more surfactants) preferably including an anionic and/or nonionic surfactant. The composition has a pH of 8 or less, more typically from 3 to 5. Such compositions can exhibit stability (e.g., phase and chemical stability) for an extended period of time, such as at least 3 months, at least 6 months, at least 9 months, or at least 12 months.

The compositions may be free of one or more of peroxides, other oxidizing agents (e.g., hypohalites), ethoxylated or other alkoxylated surfactants (particularly ethoxylated or other alkoxylated nonionic surfactants), cationic surfactants, zwitterionic surfactants, sultaine surfactants, amphoteric surfactants, organic solvents other than the phenolic solvent, quaternary ammonium compounds, biguanides, organic zinc salts, magnesium salts, sodium gluconate, sulfonates (e.g., alkane sulfonates), amine oxides, polyacrylates, and acrylate-based copolymers. In an embodiment, the composition may be free of zinc chloride. While the surfactant package can include an anionic and/or nonionic surfactant, various surfactants (e.g., alkoxylated nonionic surfactants, as well as others) may not be included, as some such alkoxylated nonionic surfactants in particular are not stable in the present formula due to its relatively high ionic strength. For example, the present compositions may include at least 1%, at least 2%, or at least 3% by weight of the zinc salt, resulting in a relatively high ionic strength in which many surfactants will not be stable.

In an embodiment, the included anionic and/or nonionic surfactant may be a sulfate (e.g., an alkyl sulfate anionic surfactant) and/or an alkyl polyglucoside nonionic surfactant. In an embodiment, both an anionic surfactant (e.g., one or more sulfates) and a nonionic surfactant (e.g., an alkyl polyglucoside) may be present in the surfactant package. No ethoxylated nonionic surfactants, or other alkoxylated nonionic surfactants may be present, as such may not be stable (e.g., phase stable) under such high ionic strength conditions. No cationic surfactants, including quaternary amines, may be present. While an amine oxide surfactant may in theory be used, in an embodiment the nonionic surfactant is an alkyl polyglucoside surfactant. The present compositions may further be free from any additional components not specifically mentioned herein.

The treatment compositions may advantageously provide at least a 2 log, or at least a 3 log reduction against a bacterial population (e.g., *Staphylococcus aureus, Klebsiella pneumonia*, or the like) when used through the wash. For example, such through the wash treatment typically exhibits a dilution factor that may be at least 50×, or at least 100×, e.g., reducing the zinc compound concentration to a value that may be less than 1000 ppm, or less than 600 ppm (e.g., such as from 50 ppm to 500 ppm, from 100 ppm to 500 ppm, from 200 ppm to 500 ppm, from 100 ppm to 400 ppm, from 150 ppm to 400 ppm, or from 200 ppm to 400 ppm). The phenolic solvent may be reduced upon dilution to a value that may be less than 500 ppm, or less than 100 ppm (e.g., such as from 1 ppm to 100 ppm, from 10 ppm to 100 ppm, from 20 ppm to 100 ppm, from 20 ppm to 80 ppm, from 20 ppm to 60 ppm, or from 30 ppm to 50 ppm). Even in such dilute conditions, the present compositions can be effective to achieve a 2 or 3 log reduction in a target bacterial population.

An exemplary treatment composition may include water (e.g., accounting for 75% or more, or 80% or more of the composition), 1% to 10% by weight of an inorganic zinc salt, 0.1% to 5% by weight of a phenolic solvent (e.g., one or more of phenoxyethanol, chloroxylenol, cresylic acid, cresol, or o-benzyl-chlorophenol), 2% to 10% by weight of a surfactant package comprising an anionic and/or nonionic surfactant (e.g., an alkyl sulfate and an alkyl polyglucoside), and an organic or inorganic pH adjusting agent. The composition can have a pH of 5 or less (e.g., 2 to 5, or 3 to 5). The composition may be free from peroxides, other oxidizing agents (e.g., hypohalites), ethoxylated or other alkoxylated nonionic surfactants, cationic surfactants, zwitterionic surfactants, sultaine surfactants, amphoteric surfactants, organic solvents other than the phenolic solvent, quaternary ammonium compounds, biguanides, organic zinc salts, magnesium salts, sodium gluconate, sulfonates (e.g., alkane sulfonates), amine oxides, polyacrylates, and acrylate-based copolymers, to name a few. In an embodiment, the composition may be free of zinc chloride. The present compositions may further be free from any additional components not specifically mentioned herein. The composition may provide at least a 2 log reduction (e.g. 3 or better) against one or more target microbes when used through the wash. Advantageously, the composition may provide both phase stability and stability of the zinc salt and phenolic solvent components for a period of at least 3 months, at least 6 months, at least 9 months, or at least 12 months.

Another embodiment is directed to a liquid antimicrobial laundry treatment composition that may consist of water (e.g., accounting for 75% or more, or 80% or more of the composition), 1% to 10% by weight of an inorganic zinc salt, 0.1% to 5% by weight of a phenolic solvent (e.g., one or more of phenoxyethanol, chloroxylenol, cresylic acid, cresol, or o-benzyl-chlorophenol), 2% to 10% by weight of a surfactant package that includes an anionic and/or a nonionic surfactant (e.g., an alkyl sulfate and/or an alkyl polyglucoside), and an organic or inorganic pH adjusting agent. The composition may have a pH of 5 or less, or 4.5 or less (e.g., 2 to 5, or 3.5 to 4.5). Optionally, one or more of thickener, an optical brightener, a polymeric suspension agent, an enzyme, a dye, colorant or pigment, a fragrance or perfume, a solvent, a co-surfactant, a hydrotrope, a stain and soil repellant, a lubricant, a solubilizing agent, a stabilizer, a defoamer, a preservative, or a buffer may be present. The composition provides at least a 2 or at least a 3 log reduction against a bacterial population when used "through the wash", and the composition provides phase and chemical stability over a period of at least 3, 6, 9 or 12 months.

The composition typically includes a majority water (e.g., more than 50%, more than 60%, more than 70%, more than 75%, such as 75-90%, or 75-85% water). The composition may be color-safe, and free from peroxides and other oxidizing agents (e.g., hypohalites, or other oxidizing or bleaching agents). The composition may include a chelating agent, even with the inclusion of the zinc salt. By way of non-limiting example, such a chelating agent may include methylglycinediacetic acid ("MGDA"), tetrasodium glutamate diacetate ("GLDA"), and/or another amino acid based chelator, which does not interfere with the included zinc salt or other included components. Any of the compositions described herein may be free or substantially free of other antimicrobial metal ions (e.g., silver or the like), as the present zinc ions are less likely to stain fabrics than other such metals.

While citric acid may be included as a pH adjusting agent in the present formulations, it is not typically included as a sequestrant or chelating agent. Similarly, quaternary amines, biguanides or other antimicrobial agents other than the zinc salt and phenolic solvent are not present primarily as antimicrobial agents, or preferably present at all.

In an embodiment, a polymeric anti-redeposition agent or suspension agent such as a cationic polyethylene imine polymer, an ethoxylated polyethyleneimine polymer or the like may be present. Although such a polyethylene imine polymer may technically be cationic, it is not included as a cationic surfactant, but as an anti-redeposition agent, to aid in soil removal and suspension. Where included, such is present in amounts of less than 1% (e.g., less than 0.8%, less than 0.7%, or less than 0.6% by weight). Such cationic polymers differ from cationic surfactants which are excluded from the present formulations in that such cationic polymers are of significantly greater molecular weight (as they are polymers). For example, excluded cationic surfactants are typically of far lower molecular weights than any cationic polymers (e.g., less than 5,000, less than 3,000, less than 1,000, or less than 500 Daltons). Other differences include that their cationic charge is not fixed (as compared to, e.g., quaternary amine surfactants), but can depend on pH.

Another aspect of the present disclosure relates to a method of treating a fabric including contacting the fabric (e.g., soiled or otherwise stained) with any of the treatment compositions described herein. The terms "soil" and "stain" are used interchangeably herein. In an embodiment, the contacting occurs before washing the fabric (i.e., the treatment composition is applied as a pre-treatment to later contemplated washing). In another embodiment, the contacting occurs at the time the fabric is washed (e.g., by adding the treatment composition to the wash water), so that the treatment composition can be used to boost stain removal performance beyond that provided by a detergent composition alone, and/or to provide sanitization and/or disinfection to the fabric being washed or otherwise treated.

Further features and advantages of the present invention will become apparent to those of ordinary skill in the art in view of the detailed description of preferred embodiments below.

DETAILED DESCRIPTION

I. Definitions

Before describing the present invention in detail, it is to be understood that this invention is not limited to particularly exemplified compositions, systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim. As will be appreciated by those of skill in the art, many surfactants and some other ingredients contemplated herein may be provided where only a fraction of the surfactant or other component as provided is weight percent active, while the remainder is water, another carrier, etc. By way of example, a given surfactant may only include 30%-50% actives, as provided, such that in order to obtain 2.25% surfactant in the finished composition, it may be necessary to add 7.5% by weight of the as provided surfactant (e.g., if it is only 30% actives). In another example, where 1.9% active surfactant is desired, and the surfactant as provided is 50% active, it may be necessary to add 3.8% of the surfactant as provided. The inclusion of such carrier or other non-active components is contemplated in any instances where the composition is described as "consisting of" a listing of certain components, either in the claims, or in the present specification.

It must be noted that, as used in this specification and the appended claims, the singular forms "a," "an" and "the" include plural referents unless the content clearly dictates otherwise.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing or formulation process, and may include values that are within 10%, within 5%, within 1%, etc. of a stated value.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. Any numerical value, however, inherently contains certain errors necessarily resulting from the standard deviation found in their respective testing measurements.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, amounts listed in percentage ("%'s") are in weight percent (based on 100% active) of the treatment composition.

The phrase 'free of' or similar phrases as used herein means that the composition comprises 0% of the stated component, that is, the component has not been intentionally added to the composition. However, it will be appreciated that such components may incidentally form, under some circumstances, as a byproduct or a reaction product from the other components of the composition, or such component may be incidentally present within an included component, e.g., as an incidental contaminant.

The phrase 'substantially free of' or similar phrases as used herein means that the composition preferably comprises 0% of the stated component, although it will be appreciated that very small concentrations may possibly be present, e.g., through incidental formation, as a byproduct or a reaction product from the other components of the composition, incidental contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%.

The compositions described herein may provide sanitization. As used herein, the term "sanitize" shall mean the reduction of contaminants in the inanimate environment to levels considered safe according to public health ordinance, or that reduces the bacterial population by significant numbers where public health requirements have not been established. By way of example, an at least 99% reduction (2-log reduction) in bacterial population within a 1 hour time period is deemed "significant." Greater levels of reduction are possible, as are faster treatment times (e.g., within a 10-20 minute wash cycle), when sanitizing through the wash, as is presently contemplated. In contrast, the term "disinfect" is more typically reserved for a more complete antimicrobial treatment, e.g., including the elimination of many or all pathogenic microorganisms on surfaces with the exception of bacterial endospores. In further contrast, the term "sterilize" typically refers to the complete elimination or destruction of all forms of microbial life. Some embodiments of the present compositions provide for at least a 2 log, or at least a 3 log reduction in bacterial population within a designated time period (e.g., within a 10-20 minute wash cycle or the like). A 2-log reduction is equivalent to a 99% reduction, a 3-log reduction is equivalent to at least a 99.9% reduction, etc.

The presently claimed compositions are both phase stable, and exhibit chemical stability of the components in the composition. By phase stable, it is meant that the compositions are clear (except for intentional inclusion of a pigment, colorant, or dye), rather than exhibiting any undesirable precipitation or phase separation of components. By chemical stability, it is meant that the amount of the active zinc salt and/or phenolic solvent within the treatment compositions remains sufficiently stable, over the shelf life (e.g., at least 3 months, at least 6 months, at least 9 months, or at least 12 months) of the composition, to provide the desired sanitization or disinfection. By way of example, at least 50%, at least 60%, at least 70%, at least 80%, or at least 90% of the initial zinc salt and/or phenolic solvent concentration may remain, after such time period, under storage at ambient temperature (e.g., 20-30° C., such as 25° C.) conditions. As will be appreciated by those of skill in the art, concentration stability of any of the composition components can be evaluated using various techniques to determine the concentration of any such component remaining after a given storage period at such temperature, e.g., using any of various methods.

As used herein, "through the wash" refers to wash treatment (e.g., whether in a washing machine, hand washing, use as a pre-treatment followed by washing, or the like) where such wash treatment exhibits a dilution factor of at least 50×, or at least 100×. By way of nonlimiting example, such uses may include adding the present compositions to the wash water (e.g., at the start of the wash cycle), or as a spotter pre-treatment. It will be apparent that such compositions can be used in a variety of ways, e.g., added to wash water, added to rinse water, e.g., after completion of a wash cycle in a washing machine, added to water used to soak articles being laundered, as a pre-treatment contacted directly with the article being treated, etc. Such compositions may be used alone, or with another treatment composition (e.g., with laundry detergent, fabric softeners, fragrance beads, etc.). Typical top loading or high efficiency washing machines operate at dilution factors of at least 100×. Hand washing may be performed at a somewhat lower dilution factor, e.g., at least 50×. All such and similar uses as noted above are contemplated, and are within the scope of the term "through the wash". The concentration of the inorganic zinc salt and the phenolic solvent may be reduced upon dilution to concentration values as described herein. Even under such dilute conditions, the present compositions can be effective to achieve a 2 or 3 log reduction in a target bacterial population.

Any reference to ASTM or other standardized tests refers to the latest update to any such standard, unless otherwise indicated. Any such referenced standards are herein incorporated by reference in their entirety.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

The present invention is directed to treatment compositions for use in laundry. In particular, in addition to effectively removing stains as compared to detergent alone, both through the wash and as a pre-treatment, the present compositions advantageously further provide a sanitization benefit. The compositions advantageously are capable of such without the use of chlorine bleach or other oxidizing agents (e.g., peroxides). As such, the compositions are safe to use on a wide variety of fabrics and dyes (i.e., they are color-safe). Using the present compositions provides a very convenient way to sanitize fabrics through the wash, by simply adding the present compositions to the wash water (e.g., at the start of the wash cycle), or as a spotter pre-treatment. It will be apparent that such compositions can be used in a variety of ways, e.g., added to wash water, added to rinse water, e.g., after completion of a wash cycle in a washing machine, added to water used to soak articles being laundered, as a pre-treatment contacted directly with the article being treated, etc. Such compositions may be used alone, or with another treatment composition (e.g., with laundry detergent, fabric softeners, fragrance beads, etc.). In an embodiment, the composition is separate from any such laundry detergent or other treatment composition, e.g., although the composition may be compatible for use with such treatment compositions. In another embodiment, the composition could be formulated to be one and the same, with a laundry detergent, or any other such treatment composition, so as to provide sanitization to such treatment composition, in addition to whatever other benefits such treatment composition may provide.

The composition may be free of one or more of hypohalites (e.g., hypochlorites) and other chlorine oxidants, peroxide and other oxidants, alkoxylated (e.g., ethoxylated) nonionic surfactants, certain enzymes (e.g., those that are not stable under acidic conditions), phosphorous-containing compounds, quaternary ammonium compounds and other cationic surfactants, zwitterionic surfactants, sultaine surfactants, amphoteric surfactants, organic solvents other than the phenolic solvent, quaternary ammonium compounds, biguanides or other organic antimicrobial agents, organic zinc salts, magnesium salts, other metal salts other than the zinc salt, sodium gluconate, sodium gluconate sulfonates, other sulfonates (e.g., alkane sulfonates), amine oxides, polyacrylates, and acrylate-based copolymers, borates and boric acid, hydroxides, chelating agents that would interfere with the zinc salt, amine oxides, and ethoxylated amine polymers. In an embodiment, the composition may be free of zinc chloride. In an embodiment, any included surfactants may include only nonionic and/or anionic surfactants. As noted herein, the compositions may also be free from other components not mentioned as present, e.g., such as lower alcohol solvents (e.g., $C_1$-$C_4$ alcohols), or numerous other additives included in existing compositions that may appear superficially similar.

The compositions may advantageously include water and a zinc salt in combination with a phenolic solvent, with an anionic and/or nonionic surfactant, such as an alkyl sulfate and/or an alkyl polyglucoside surfactant (e.g., particularly a combination that includes both an alkyl sulfate surfactant and an alkyl polyglucoside surfactant). Inorganic zinc salts such as those used herein are stable with alkyl sulfates under acidic conditions. The combination in at least some embodiments of nonionic alkyl polyglucosides with anionic alkyl sulfates increases the cloud point of these nonionic surfactants, particularly in the presence of high levels of electrolyte (i.e., the zinc salt). Such characteristics are advantageous.

Those of skill in the art will appreciate that cloud point is a property associated with nonionic surfactants and formulas containing such nonionic surfactants. Various methods of determining cloud point will be apparent to those of skill in the art, any of which methods may be used. By way of example, the selected nonionic surfactant may exhibit a cloud point above 45° C., above 50° C., less than 90°, less than 80° C., less than 70° C., such as from 50° C. to 60° C. For example, the cloud point for a given surfactant corresponds to the temperature above which the sample becomes turbid. According to one method, a 1% dilution of a given surfactant in water may be used, which is initially transparent. Upon reaching the cloud point, the solution becomes turbid. Various devices are available for automatically determining cloud point using such or similar methods, and will be apparent to those of skill in the art. The employed nonionic surfactants are stable when formulated according to the present invention and do not exhibit undesirable cloud point characteristics in the present compositions that exhibit high ionic strength (e.g., at least 1%, at least 2%, or at least 3% of the zinc salt).

The composition has a pH of 8 or less, 7 or less, 6 or less, or 5 or less, such as from 2 to 6, 2 to 5, or 3.5 to 4.5. A pH adjusting agent (e.g., an organic or inorganic acid) may be included to achieve the desired pH, to ensure stability of the composition, and its microefficacy.

One or more various other optional components may be included, such as a thickener, an optical brightening agent, an enzyme stable under the composition conditions, additional surfactants or co-surfactants, a hydrotrope, a fragrance or perfume, a dye, colorant or pigment, a stain and soil repellant, a lubricant, a solubilizing agent, a suspension or anti-redisposition agent, a stabilizer, a defoamer, a preservative, a buffer, or combinations thereof.

Even where one or more optional components are included, typically the concentration of ingredients other than water is quite low, such that the water may comprise at least 50%, at least 60%, at least 70%, at least 75%, or at least 80%, (e.g., 80% to 95%, or 80-90%) by weight of the composition. The surfactant package (e.g., a combination of nonionic and anionic surfactants) may be the second most present component, after the water, followed by the zinc salt. The water included in the composition may be deionized water, or water which is otherwise softened to reduce or substantially eliminate the presence of undesirable ions (e.g., particularly metal ions such as, but not limited to copper, iron, magnesium, calcium, and the like). For similar reasons that the composition may advantageously be free of magnesium salts, the composition may generally be free from various other metal salts other than the zinc salt (e.g., including, but not limited to iron, copper, calcium, and the like, as such salts or ions may undesirably react with components present in the composition, stain fabrics, etc.). Even if some small amount of such ions may be present, the composition can include a chelating agent (e.g., an amino acid-based chelating agent, such as MGDA and/or GLDA), to minimize the effects of such.

III. Exemplary Treatment Compositions

A. Zinc Salt

The treatment composition advantageously includes a soluble zinc salt, such as zinc sulfate, although it will be appreciated that other soluble zinc salts (e.g., inorganic zinc salts) may alternatively be suitable for use. In an embodiment, the zinc salt is an inorganic, rather than an organic salt (e.g., including carbon-carbon bonds). In an embodiment, the included zinc sulfate is a hydrate, e.g., the monohydrate (e.g., $ZnSO_4 \cdot H_2O$). The zinc salt may be present within the present composition in an amount of at least 0.1%, at least 0.25%, at least 0.5%, at least 1%, at least 2%, at least 3%, from 0.1% to 15%, 0.1% to 10%, 0.5% to 5%, 1% to 5%, or 2% to 5% by weight of the composition. Zinc sulfate monohydrate has a solubility in water of about 350 g/L (e.g., at 20° C.). Other suitable zinc salts may also exhibit antimicrobial activity and may have similar solubility values, e.g., at least 100 g/L, or at least 200 g/L such as from 100 g/L to 800 g/L, from 100 g/L to 600 g/L, from 100 g/L to 500 g/L, from 200 g/L to 500 g/L, or from 300 g/L to 400 g/L. Although zinc chloride is an inorganic zinc salt, in an embodiment, the composition is free, or substantially free of zinc chloride, which exhibits less antimicrobial activity than zinc sulfate, and which is very soluble in water (e.g., over 4000 g/L).

B. Phenolic Solvent

The treatment composition advantageously includes a phenolic solvent, such as phenoxyethanol, chloroxylenol (PCMX), cresylic acid, cresol, or o-benzyl-chlorophenol, to name a few.

A synergistic sanitization effect is achieved when the phenolic solvent is provided with the zinc salt, with the other components of the formulation. By way of example, the formulation may include at least 0.05%, at least 0.1%, at least 0.25%, from 0.1% to 5%, from 0.1% to 4%, from 0.1% to 3%, 0.1% to 2%, from 0.1% to 1%, such as from 0.25% to 1%, or 0.25% to 0.5% of the phenolic solvent. In an embodiment, the molar ratio of the zinc salt (e.g., $ZnSO_4 \cdot H_2O$) to phenolic solvent may be from 3:1 to 10:1, such as from 5:1 to 8:1.

C. Nonionic Surfactant

The composition can advantageously include a nonionic surfactant. The nonionic surfactant may aid in thickening the composition, even at an acidic pH. Avoiding inclusion of various components as described herein which can interfere with phase stability may be an important characteristic of the present compositions. In an embodiment, the nonionic surfactant is an alkyl polyglucoside, or another alkyl polysaccharide surfactant. Other nonionic surfactants that can maintain stability even where the ionic strength of the composition is high (e.g., due to the zinc salt) may also be suitable for use. In compositions where thickening is not desired, no nonionic surfactant need be present. Such compositions may include an anionic surfactant (e.g., just the anionic surfactant).

Alkylpolysaccharides that may be suitable for use herein are disclosed in U.S. Pat. No. 4,565,647 to Llenado. Such may have a linear or branched alkyl, alkylphenyl, hydroxyalkyl, or hydroxyalkylphenyl group containing from 6 to 30 carbon atoms and a polysaccharide, e.g., a polyglycoside, hydrophilic group containing from 1.3 to 10 saccharide units. Suitable saccharides include, but are not limited to, glucosides, galactosides, lactosides, and fructosides. Alkylpolyglycosides may have the formula: $R^2O(CnH_{2n}O)_t(glycosyl)_x$ wherein $R^2$ is selected from the group consisting of alkyl, alkylphenyl, hydroxyalkyl, hydroxyalkylphenyl, and mixtures thereof in which the alkyl groups contain from 10 to 18 carbon atoms; n is 2 or 3; t is from 0 to 10, and x is from 1.3 to 10.

The amount of the nonionic surfactant may be at least 0.1%, at least 0.5%, at least 1%, up to 20%, up to 15%, up to 10%, from 1% to 10%, from 1% to 5%, or from 1% to 3% by weight of the composition. For example, the weight percent of the nonionic surfactant may be 0.5%, 1%, 1.5%, 2%, 2.5%, 3%, 3.5%, 4%, 4.5%, or 5% by weight of the composition, or any range defined between two of such weight percent values.

D. Anionic Surfactant

In an embodiment, the composition includes an anionic surfactant, either alone or with the nonionic surfactant described above. By way of example, any such anionic surfactant may be included in an amount that is similar to the concentration of the nonionic surfactants noted above. For example, the amount of the anionic surfactant may be at least 0.1%, at least 0.5%, at least 1%, up to 20%, up to 15%, up to 10%, from 1% to 10%, from 1% to 5%, or from 1% to 3% by weight of the composition. For example, the weight percent of the anionic surfactant may be 0.5%, 1%, 1.5%, 2%, 2.5%, 3%, 3.5%, 4%, 4.5%, or 5% by weight of the composition, or any range defined between two of such weight percent values. Where both anionic and nonionic surfactants are present, the ratio of nonionic surfactant to anionic surfactant may be from 5:1 to 1:5, from 3:1 to 1:3, from 2:1 to 1:2, such as about 1:1. As noted above, the nonionic surfactant can serve to increase viscosity of the composition, while the anionic surfactant may increase the antimicrobial activity of the composition, and provide for improved cleaning, with the nonionic surfactant. The anionic surfactant may also serve to aid in stabilizing the zinc salt, e.g., complexing with the zinc salt, increasing solubility thereof. The combination of the anionic and nonionic surfactants described herein (e.g., particularly an anionic surfactant such as SLS in combination with an alkyl polyglucoside) give a viscosity build that is especially good for a through the wash laundry booster.

Examples of suitable anionic surfactants include alkyl sulfates (e.g., linear or branched alkyl sulfates such as sodium lauryl sulfate (SLS)). The alkyl chain length may be from 4 to 22, from 6 to 18, from 6 to 16, from 6 to 14, or from 8 to 12 carbon atoms (e.g., $C_3$, $C_4$, $C_6$, $C_8$, $C_{10}$, $C_{12}$, $C_{14}$, $C_{16}$, $C_{18}$, $C_{20}$). Sodium lauryl sulfate is a specific suitable example of such. Additional examples of anionic surfactants include, but are not limited to other alkyl ether sulfates (e.g., sodium lauryl ether sulfate), fatty alcohol sulfates (e.g., with carbon chain lengths as above), various sulfonates, disulfonates, and any carboxylate fatty acids, particularly where such include alkyl groups have more than 1, more than 2, more than 3, more than 4, or 8 or more carbon atoms in the alkyl group. Additional examples may include alkyl sulfonates (e.g., $C_6$-$C_{18}$ linear or branched alkyl sulfonates such as sodium octane sulfonate and sodium secondary alkane sulfonate), fatty acids and fatty acid salts (e.g., $C_6$-$C_{16}$ fatty acid soaps such as sodium laurate), and alkyl amino acid derivatives. Other anionic examples may include alpha olefin sulfonates, $C_6$-$C_{16}$ acyl isethionates (e.g. sodium cocoyl isethionate), $C_6$-$C_{18}$ alkyl, aryl, or alkylaryl ether sulfates, $C_6$-$C_{18}$ alkyl, aryl, or alkylaryl ether methylsulfonates, $C_6$-$C_{18}$ alkyl, aryl, or alkylaryl ether carboxylates, sulfonated alkyldiphenyloxides (e.g. sodium dodecyldiphenyloxide disulfonate), and the like.

While nonionic alkoxylated surfactants may be excluded as they decrease cloud point of the formulations in the presence of the zinc salt, alkoxylated sulfates (e.g. alkoxylated ether sulfates and sulfate derivatives of alkyl ethoxylate propoxylates or alkyl ethoxylate sulfates) may be acceptable as the presence of the anionic sulfate group results in a structure that does not seem to interfere with cloud point, as is the case with nonionic alkoxylated surfactants. Such alkoxylated sulfates are more tolerant of high ionic concentration (due to the zinc salt). In any case, the presence of ethoxylated or other alkoxylated surfactants (particularly alkoxylated nonionic surfactants) that have a tendency to exhibit an undesirable decreased cloud point because of the relatively high ionic strength of the present compositions (e.g., due to the zinc salt) are avoided.

By way of example, the one or more anionic surfactants may be present in an amount of at least 0.1%, at least 0.5%, at least 1%, up to 20%, up to 15%, up to 10%, from 1% to 10%, from 1% to 5%, or from 1% to 3% by weight of the composition. For example, the weight percent of the anionic surfactant may be 0.5%, 1%, 1.5%, 2%, 2.5%, 3%, 3.5%, 4%, 4.5%, or 5% by weight of the composition, or any range defined between two of such weight percent values.

While an anionic or nonionic surfactant may be used alone, in an embodiment the surfactant package may include both an anionic surfactant and a nonionic surfactant. The total surfactant concentration may similarly range from at least 0.1%, at least 0.5%, at least 1%, up to 20%, up to 15%, up to 10%, from 1% to 10%, from 1% to 5%, or from 1% to 3% by weight of the composition. For example, the weight percent of the total surfactant package may be 2%, 2.5%, 3%, 3.5%, 4%, 4.5%, 5%, 5.5%, 6%, 6.5% 7%, 7.5%, 8%, 8.5%, 9%, 9.5%, or 10% by weight of the composition, or any range defined between two of such weight percent values.

Zwitterionic surfactants that may be included, or avoided, depending on whether they interfere with stability under the present high ionic strength and other conditions may include, but are not limited to those containing nitrogen (e.g., many zwitterionic surfactants contain nitrogen). Examples of zwitterionic surfactants can include but are not limited to sarcosinates, taurates and betaines.

Examples of cationic surfactants that are to be avoided may include, but are not limited to monomeric or other quaternary ammonium compounds, and monomeric or other biguanide compounds.

Disclosure of various other surfactants (suitable classes and those to be avoided), depending on whether they interfere with stability under the present high ionic strength and other conditions may be found in one or more of U.S. Pat. No. 3,929,678 to Laughlin, U.S. Pat. No. 4,259,217 to Murphy, U.S. Pat. No. 5,776,872 to Giret et al., U.S. Pat. No. 5,883,059 to Furman et al., U.S. Pat. No. 5,883,062 to Addison et al., U.S. Pat. No. 5,906,973 to Ouzounis et al., and U.S. Pat. No. 4,565,647 to Llenado. Each of the above patents is herein incorporated by reference in its entirety.

The treatment composition may be thickened as a result of the surfactant package selection to increase the viscosity of the composition. While examples of the present compositions can be thickened with surfactants, it may also be possible to achieve thickening with a gum or other thickener that is stable under acidic conditions. Such thickened rheology may aid the composition in remaining on a location of a fabric where sprayed, dispensed, or otherwise placed when used as a pre-treatment. For example, a "runny", or "thin" treatment composition may have difficulty remaining in place, in contact with the stain being treated, particularly when used as a pre-treatment, where treatment occurs outside of the typical diluting wash water. Examples of thickeners include, but are not limited to acid stable polysaccharide gums, such as xanthan gum. Other gums may also be suitable for use, e.g., such as gum arabic, gum ghatti, gum tragacanth, karaya gum, guar gum, locust bean gum, beta-glucan, chicle gum, dammar gum, glucomannan, mastic gum, psyllium gum, spruce gum, tara gum, gellan gum, carrageenan, and combinations of gums.

In an embodiment, cellulosic thickeners, such as hydroxyethyl cellulose and hydroxypropyl cellulose are not present, as such thickeners may not be stable acidic conditions typically present in the present compositions. Other thickeners which are not stable in the formulation are also not included. For example, acrylate thickeners, as well as various associative thickeners are not included. Associative thickeners are polymeric thickeners of relatively high molecular weight (e.g., greater than 1,000, greater than 5,000, up to 100,000 or even higher), which include hydrophobic and hydrophilic moieties. Such associative thickeners are intended to act to thicken aqueous liquids in which a hydrophobic component has been dispersed.

The amount of the thickener, where included, may be up to 2%, up to 1.5%, up to 1%, up to 0.75%, up to 0.5%, from 0.01% to 1%, from 0.1% to 1%, from 0.15% to 0.75%, from 0.15% to 0.5%, or from 0.2% to 0.3%. For example, if present, the thickener may be included in an amount of 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, or within any range defined between two of any of the foregoing values.

The treatment composition may be of moderate viscosity (e.g., sufficiently thick to remain in place, as applied to a stain, but thin enough to dispense through a trigger spray bottle). In an embodiment, the viscosity may be at least 30 cps, at least 50 cps, at least 100 cps, no more than 5,000 cps, no more than 3,000 cps, no more than 2000 cps, from 150 cps to 2,000 cps, from 150 cps to 500 cps, from 150 cps to 300 cps, from 100 cps to 200 cps, or from 150 to 200 cps.

E. pH Adjusting Agents

The present treatment compositions may include one or more pH adjusting agents. In an embodiment, the pH adjusting agent may be an organic or inorganic acid. Where an acid is included, its inclusion is primarily for adjusting pH, rather than for another purpose (e.g., sanitization). The compositions may have a pH within a range of at least 2, at least 3, up to 8, up to 7, up to 6, up to 5, from 2 to 8, from 2 to 6, from 2 to 5, from 3 to 5, from 3.5 to 4.5. For example, the pH may be any value between the above values, or within any ranges defined between any two of such pH values.

Any of various organic and inorganic acids may be suitable for use. The most common organic acids include but are not limited to, carboxylic acids (e.g., citric acid), sulfonic acids (e.g., methane sulfonic acid), and combinations thereof. Organic acids are typically weak acids that usually do not completely dissociate in water. Common inorganic acids include but are not limited to sulfuric acid. Any of these acids may be used as pH adjusting agents.

Various carboxylic acids may be suitable for use, including citric acid, tartaric acid, malic acid, mandelic acid, oxalic acid, glycolic acid, lactic acid, acetic acid, formic acid, and combinations thereof. Sulfonic acids corresponding to any of the above carboxylic acids may also be used (e.g., where the carboxylic acid group is replaced with a sulfonic acid group). A particular example of a suitable sulfonic acid is methane sulfonic acid (e.g., corresponding to formic acid). Because the compositions include such acids for pH adjustment (rather than sanitization or other purposes), the concentration of any included pH adjusting agent may be less than 5%, less than 4%, less than 3%, less than 2%, less than 1%, less than 0.5%, or less than 0.2% by weight, such as from 0.001% to 1%, from 0.005% to 0.5%, from 0.01% to 0.5%, or from 0.05% to 0.2% by weight. For example, the pH adjusting agent may be included in an amount of 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, or 0.5%, or within any range defined between two of any of the values mentioned above.

F. Polymeric Anti-Redeposition Agents

The compositions may include an anti-deposition agent or suspension agent. With respect to any polymeric anti-redeposition agent, while such component may technically typically be a cationic polymer, this component is not added as a cationic surfactant (and is not a monomeric cationic species, such as a quaternary amine surfactant), but is added for a different purpose (as an anti-redeposition agent), if present at all. In embodiments free of cationic surfactants (or other named classes of surfactants), it is meant that no components included for surfactant purposes are cationic (e.g., no monomeric quaternary amines or the like).

Such a polymeric anti-redeposition agent minimizes or prevents soils and stains loosened from the fabric (e.g., by the nonionic surfactant or otherwise) from redepositing on the fabric. In an embodiment, the anti-redeposition agent is a polymer, such as an ethoxylated polyethyleneimine polymer. Exemplary ethyoxylated polyethyleneimine polymers may be derived from ethylene imine. Examples of such include the SOKALAN® HP series of polymers, such as SOKALAN® HP 20, available from BASF® Corporation.

Any polymeric anti-redeposition agent may be included in an amount of less than 5%, less than 4%, less than 3%, less than 2%, or less than 1%, such as from 0.01% to 2%, from 0.1% to 1%, or from 0.3% to 0.8%, or any value or range defined between two of such weight percent values.

G. Other Components

As will be apparent, the treatment compositions may optionally include an optical brightening agent, an enzyme that is stable in the presence of the acid (if the pH is acidic), a hydrotrope, a fragrance or perfume, a dye, colorant or pigment, a stain and soil repellant, a lubricant, a solubilizing agent, a stabilizer, a defoamer, a preservative, a buffer, and combinations thereof. In an embodiment, oxidizing agents, such as hypohalites are avoided, as they are not color-safe. Other oxidants such as peroxides can be avoided as they are not compatible with the zinc salt. Any of such noted optional components may also specifically be absent from the compositions. Where included, such optional components may typically individually comprise no more than 3%, no more than 2%, no more than 1%, no more than 0.5%, no more than 0.25% or no more than 0.1% of the composition by weight.

The compositions may be compatible with and intended for typical use with detergent compositions for through the wash usage. For example, in some embodiments, a consumer may use the treatment composition as a pre-treatment or added to the wash water, and may also add a laundry detergent composition to the wash water as well. Because the compositions do not include chlorine oxidants, or even any oxidants, they exhibit a very high compatibility across a wide variety of fabrics, of any color, dyed with any dye.

IV. Examples

Example 1

An exemplary aqueous treatment composition was prepared by combining the components as shown in Table 1 below. The composition of Example 1 had a pH of about 4.

TABLE 1

| Component | Wt. % Active | Purpose |
|---|---|---|
| water | balance | carrier |
| MGDA | 0.48 | chelant |
| sodium lauryl sulfate | 2.36 | anionic surfactant |
| alkyl polyglucoside | 2.00 | nonionic surfactant |
| phenoxyethanol | 0.40 | phenolic solvent |
| $ZnSO_4 \cdot H_2O$ | 3.30 | sanitization |
| methane sulfonic acid | 0.133 | pH adjustment |

Example 2

An exemplary aqueous treatment composition was prepared by combining the components as shown in Table 2 below. The composition of Example 2 had a pH from 3.5 to 4.5.

TABLE 2

| Component | Wt. % Active | Purpose |
|---|---|---|
| water | balance | carrier |
| MGDA | 0.48 | chelant |
| sodium lauryl sulfate | 2.00 | anionic surfactant |
| alkyl polyglucoside | 2.00 | nonionic surfactant |
| Na lauryl ether sulfate | 0.40 | linear anionic surfactant |
| phenoxyethanol | 0.40 | phenolic solvent |
| $ZnSO_4 \cdot H_2O$ | 3.30 | sanitization |
| methane sulfonic acid | 0.13 | pH adjustment |

Example 3

An exemplary aqueous treatment composition was prepared by combining the components as shown in Table 3 below. The composition of Example 3 was clear, had a pH of 4.0, and a viscosity of 164 cps.

TABLE 3

| Component | Wt. % Active | Purpose |
|---|---|---|
| water | balance | carrier |
| NaOH | 0.10 | pH adjustment |
| fatty alcohol sulfate | 2.25 | anionic surfactant |
| alkyl polyglucoside | 2.00 | nonionic surfactant |
| Na lauryl ether sulfate | 0.147 | linear anionic surfactant |
| chloroxylenol | 0.40 | phenolic solvent |
| $ZnSO_4 \cdot H_2O$ | 3.30 | sanitization |
| citric acid | 0.26 | pH adjustment |

Example 4

An exemplary aqueous treatment composition was prepared by combining the components as shown in Table 4 below. The composition of Example 4 was clear, had a pH of 4.0, and a viscosity of 144 cps.

TABLE 4

| Component | Wt. % Active | Purpose |
|---|---|---|
| water | balance | carrier |
| MGDA | 0.48 | chelant |
| fatty alcohol sulfate | 2.19 | anionic surfactant |
| alkyl polyglucoside | 2.00 | nonionic surfactant |
| Na lauryl ether sulfate | 0.168 | linear anionic surfactant |
| chloroxylenol | 0.40 | phenolic solvent |
| $ZnSO_4 \cdot H_2O$ | 3.30 | sanitization |
| citric acid | 0.10 | pH adjustment |

Example 5

An exemplary aqueous treatment composition was prepared by combining the components as shown in Table 5 below. The composition of Example 5 had a pH of 4.0.

TABLE 5

| Component | Wt. % Active | Purpose |
|---|---|---|
| water | balance | carrier |
| MGDA | 0.96 | chelant |
| fatty alcohol sulfate | 2.19 | anionic surfactant |
| alkyl polyglucoside | 2.00 | nonionic surfactant |
| Na lauryl ether sulfate | 0.168 | linear anionic surfactant |
| chloroxylenol | 0.40 | phenolic solvent |
| $ZnSO_4 \cdot H_2O$ | 3.30 | sanitization |
| methane sulfonic acid | 0.16 | pH adjustment |

Example 6

An exemplary aqueous treatment composition was prepared by combining the components as shown in Table 6 below. The composition of Example 6 had a pH of 4.0.

TABLE 6

| Component | Wt. % Active | Purpose |
|---|---|---|
| water | balance | carrier |
| MGDA | 0.48 | chelant |
| fatty alcohol sulfate | 2.19 | anionic surfactant |
| alkyl polyglucoside | 2.00 | nonionic surfactant |
| Na lauryl ether sulfate | 0.168 | linear anionic surfactant |
| chloroxylenol | 0.40 | phenolic solvent |
| $ZnSO_4 \cdot H_2O$ | 3.30 | sanitization |
| methane sulfonic acid | 0.13 | pH adjustment |

Example 7

An exemplary aqueous treatment composition was prepared by combining the components as shown in Table 7 below. The composition of Example 7 was clear, had a pH of 4.0, and a viscosity of 163 cps.

TABLE 7

| Component | Wt. % Active | Purpose |
|---|---|---|
| water | balance | carrier |
| MGDA | 0.48 | chelant |
| fatty alcohol sulfate | 2.25 | anionic surfactant |
| alkyl polyglucoside | 1.90 | nonionic surfactant |
| phenoxyethanol | 0.40 | phenolic solvent |

TABLE 7-continued

| Component | Wt. % Active | Purpose |
|---|---|---|
| $ZnSO_4 \cdot H_2O$ | 3.30 | sanitization |
| methane sulfonic acid (35%) | 0.12 | pH adjustment |

The wash performance of a formulation such as those noted above is evaluated for % reduction against a target microorganism (e.g., *Staphylococcus aureus*). The evaluated formula provides microefficacy results such as those shown below, when used "through the wash" in a top load (TL) or high efficiency (HE) washer. All such testing as described herein can be conducted in accordance with ASTM E2274 (for top load washers) and ASTM E2406 (for high efficiency washers).

TABLE 8

| Dilution | ppm | % Reduction |
|---|---|---|
| HE | 200 | 99.4 |
| HE | 500 | 99.99 |
| TL | 200 | 99.8 |
| TL | 500 | >99.99 |
| HE | 200 | >99 |

Example 8

An exemplary aqueous treatment composition was prepared by combining the components as shown in Table 9 below.

TABLE 9

| Component | Wt. % Active | Purpose |
|---|---|---|
| water | balance | carrier |
| NaOH | 0.10 | pH adjustment |
| sodium lauryl sulfate | 2.90 | anionic surfactant |
| alkyl polyglucoside | 1.50 | nonionic surfactant |
| chloroxylenol | 0.40 | phenolic solvent |
| ZnCl | 3.50 | sanitization |
| citric acid | 0.30 | pH adjustment |

Example 9

An exemplary aqueous treatment composition was prepared by combining the components as shown in Table 10 below.

TABLE 10

| Component | Wt. % Active | Purpose |
|---|---|---|
| water | balance | carrier |
| NaOH | 0.10 | pH adjustment |
| sodium lauryl sulfate | 2.32 | anionic surfactant |
| alkyl polyglucoside | 2.00 | nonionic surfactant |
| chloroxylenol | 0.40 | phenolic solvent |
| ZnCl | 3.50 | sanitization |
| citric acid | 0.30 | pH adjustment |

Example 10

An exemplary aqueous treatment composition was prepared by combining the components as shown in Table 11 below.

TABLE 11

| Component | Wt. % Active | Purpose |
|---|---|---|
| water | balance | carrier |
| MGDA | 0.48 | chelant |
| sodium lauryl sulfate | 2.19 | anionic surfactant |
| alkyl polyglucoside | 2.00 | nonionic surfactant |
| Na lauryl ether sulfate | 0.168 | linear anionic surfactant |
| chloroxylenol | 0.40 | phenolic solvent |
| ZnCl | 3.30 | sanitization |
| citric acid | 0.10 | pH adjustment |

The wash performance of the formulation of Table 11 was evaluated for % reduction against a target microorganism (e.g., *Staphylococcus aureus*), e.g., in accordance with ASTM E2274 and/or ASTM E2406. The results are shown below.

TABLE 12

| Lab Run No. | ppm | % Reduction for Wash Water |
|---|---|---|
| 1 | 200 | 99.2 |
| 2 | 500 | >99.9 |
| 3 | 700 | >99.9 |
| 4 | 900 | >99.9 |
| 5 | 200 | >99.9 |
| 6 | 500 | >99.9 |
| 7 | 700 | >99.9 |
| 8 | 900 | >99.9 |

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

The invention claimed is:

1. A liquid antimicrobial laundry treatment composition consisting of:

(a) an antimicrobial agent consisting of (i) and (ii):

i. about 1% to about 10% by weight of an inorganic Zn salt;

ii. about 0.1% to about 5% by weight of a phenolic solvent, the phenolic solvent being selected from the group consisting of phenoxyethanol, chloroxylenol, cresylic acid, cresol, o-benzyl-chlorophenol, and combinations thereof, (b) about 2% to about 10% by weight of a surfactant package including an anionic surfactant;

(c) an organic or inorganic acid pH adjusting agent, the pH adjusting agent being selected from the group consisting of citric acid, methane sulfonic acid, mandelic acid, glycolic acid, lactic acid, acetic acid, formic acid, and combinations thereof, (d) at least 75% by weight water;

(e) wherein the composition has a pH of about 5 or less;

(f) optionally, one or more of a thickener, an optical brightener, a polymeric suspension agent, an enzyme, a dye, colorant or pigment, a fragrance or perfume, a solvent, a co-surfactant, a hydrotrope, a stain and soil repellant, a lubricant, a solubilizing agent, a stabilizer, a defoamer, a preservative, or a buffer;

(g) wherein the composition provides at least about a 2 log reduction against a *Staphylococcus aureus* bacterial population when used "through the wash" at a dilution factor that reduces a concentration of the inorganic Zn salt to a value from 50 ppm to less than 1000 ppm; and (h) wherein a molar ratio of the inorganic Zn salt and the phenolic solvent is from 5:1 to 8:1.

2. The composition of claim 1, wherein the composition has a pH of about 3.5 to about 4.5.

3. The composition of claim 1, wherein the Zn salt comprises $ZnSO_4$.

4. The composition of claim 1, wherein the Zn salt comprises $ZnSO_4 \cdot H_2O$.

5. The composition of claim 1, wherein the surfactant package includes only nonionic and anionic surfactants.

6. The composition of claim 1, wherein the acid pH adjusting agent comprises at least one of methane sulfonic acid or citric acid.

7. The composition of claim 1, wherein the Zn salt comprises from about 1% to about 5% by weight of the composition.

8. The composition of claim 1, wherein the phenolic solvent comprises from about 0.1% to about 1% by weight of the composition.

9. The composition of claim 1, wherein the phenolic solvent comprises at least one of chloroxylenol or cresylic acid.

* * * * *